United States Patent
Liu et al.

(10) Patent No.: US 10,779,029 B1
(45) Date of Patent: Sep. 15, 2020

(54) VIDEO CREATION AT SCALE

(71) Applicant: Facebook, Inc., Menlo Park, CA (US)

(72) Inventors: Haoran Liu, San Jose, CA (US); Zuli Liu, San Mateo, CA (US); Emily Anciaux, San Francisco, CA (US); Christopher John Marra, Somerville, MA (US); Andre Cassal, San Francisco, CA (US); Peter Saisi, Mountain View, CA (US); Zhiyao Xu, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/157,580

(22) Filed: Oct. 11, 2018

(51) Int. Cl.
*H04N 21/2368* (2011.01)
*H04N 21/2668* (2011.01)
*H04N 21/231* (2011.01)
*H04N 21/258* (2011.01)

(52) U.S. Cl.
CPC ... *H04N 21/2668* (2013.01); *H04N 21/23106* (2013.01); *H04N 21/25891* (2013.01)

(58) Field of Classification Search
None
See application file for complete search history.

(56) References Cited

U.S. PATENT DOCUMENTS

| | | | | |
|---|---|---|---|---|
| 6,774,926 B1 * | 8/2004 | Ellis | ................. | H04N 5/44543 348/14.01 |
| 8,613,024 B2 * | 12/2013 | Bovenschulte | ........ | H04H 60/31 725/16 |
| 8,683,521 B1 * | 3/2014 | Gargi | ................. | H04N 21/4826 725/44 |
| 2017/0289593 A1 * | 10/2017 | Li | ................... | H04N 21/23106 |

* cited by examiner

*Primary Examiner* — Cai Y Chen
(74) *Attorney, Agent, or Firm* — Baker Botts L.L.P.

(57) ABSTRACT

In one embodiment, a method includes accessing data of a number of items from a third-party computing system; identifying a subset of the number of items based on a value of a ranking model for each identified item being higher than a pre-determined threshold value; for each identified item of the subset, determining a number of similar items from the number of items; receiving a template for a video from the third-party computing system; for each of the identified items, generating a video incorporating the identified item and the respective number of similar items in accordance with the template; caching the generated videos; and providing for display on a client device of a user, a particular one of the videos selected based on information of the user.

20 Claims, 6 Drawing Sheets

VIDEO CREATION AT SCALE

TECHNICAL FIELD

This disclosure generally relates to automated video creation.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments may automatically generate a video using a catalog of images of items. In particular embodiments, a video creator may create a video template for personalization, customize the template with a personalized message, and associate a set of items with the template. Particular embodiments may combine the video template, items of the set, and information about a particular user to create a video from the item(s) the particular user is likely to be interested in. The relevant items, based on a product recommendation and ranking model, are featured in a video shown to the particular user. In some examples, videos shown to various users have the same narrative since these videos are based off the same video template, but feature different items.

In particular embodiments, a personalized video is generated for specified items of a catalog. For example, the personalized video may have a featured item and a pre-determined number of similar items (e.g., an item that is of a similar model with a different color or different style from the same manufacturer) that are highly related to the featured item. For example, an entity may determine whether the item is displayed in a video, multi-image format (carousel), or collection format. In addition, the entity may specify a Uniform Resource Locator (URL) associated with the video, one or more call-to-action (CTA) buttons, provide a narrative, select a transition between images, font, background color, or logos. The personalized videos may be regenerated or updated for item changes (e.g., no longer available, new packaging, or price changes). An item of interest for the particular user may be identified and the video that is associated with the identified item displayed.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments may automatically generate a video using a catalog of images of items. In particular embodiments, a video creator may create a video template for personalization, customize the template with a personalized message, and associate a set of items with the template. Particular embodiments may combine the video template, items of the set, and information about a particular user to create a video from the item(s) the particular user is likely to be interested in. The relevant items, based on a product recommendation and ranking model, are featured in a video shown to the particular user. These videos have the same narrative since these videos are based off the same video template, but feature different items.

In particular embodiments, a personalized video is generated for specified items of a catalog. For example, the personalized video may have a featured item and a pre-determined number of similar items (e.g., an item that is of a similar model with different color or different style from the same manufacturer) that are highly related to the featured item. For example, an entity may determine whether the item is displayed as a video, multi-image format (carousel), or collection format. In addition, the entity may specify a Uniform Resource Locator (URL) associated with the video, one or more call-to-action (CTA) buttons, provide a narrative, select a transition between images, font, background color, or logos. The personalized videos may be regenerated or updated for item changes (e.g., no longer available, new packaging, or price changes). An item of interest for the particular user may be identified and the video that is associated with the identified item displayed.

Figure 1:
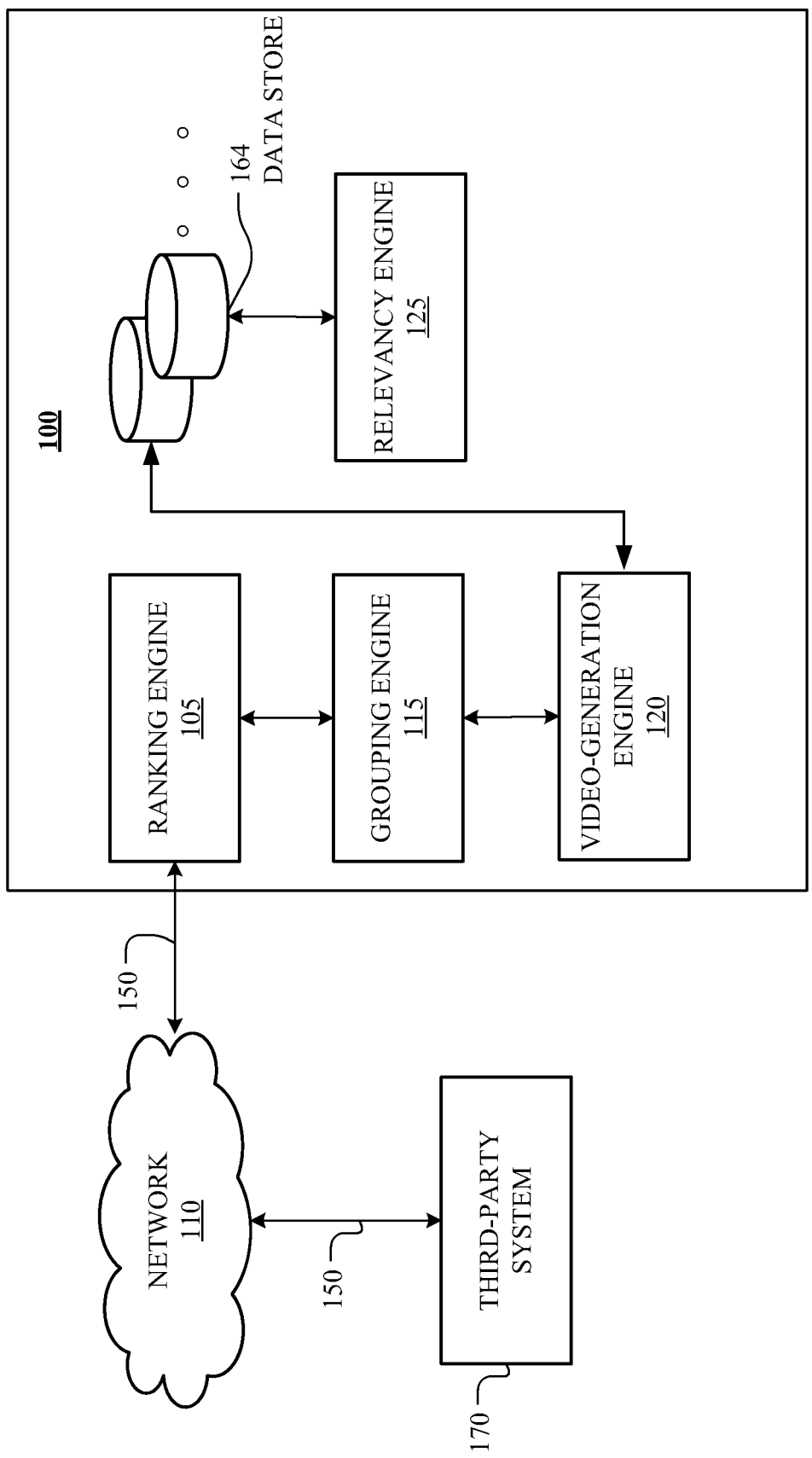
FIG. 1 illustrates an example video-creation system.

FIG. 1 illustrates an example video-creation system. A video-creation system 100 may be used to automatically generate videos using static images at scale. As illustrated in the example of FIG. 1, video-creation system 100 may include a ranking engine 105, grouping engine 115, video-generation engine 120, data store 164, and relevancy engine 125. Third-party system 170 and video-creation system 100 are coupled to network 110 through links 150. As an example and not by way of limitation, an entity (e.g., an advertiser) may provide a template for videos to be created by video-creation system 100 that incorporate a number of still images. In particular embodiments, the template for videos may include information of a format (e.g., video, multi-image (carousel), or collection). In addition, the template for videos may specify a URL associated with the video, one or more call-to-action (CTA) buttons, provide a narrative for the video, specify a transition between images, font, background color, or logos. As an example and not by way of limitation, one or more videos generated at scale by video-creation system 100 may be a video ad for presentation on a client device of a user. In particular embodiments, video-creation system 100 may be included in a social-networking system described below. Although this disclosure describes and illustrates a video-creation system with particular components, this disclosure contemplates any suitable video-creation system having any suitable components.

In particular embodiments, video-creation system 100 may receive information of a number of items from third-party system 170 through network 110. As an example and not by way of limitation, an item may include a food product, album, book, movie, television show, work of art, automobile, pet, sports team, location, a business, or any other content. The information of the items may include one or more images and a description (e.g., price, color, size, or features) of the items. In particular embodiments, ranking engine 105 may rank these items based on a ranking model. As an example and not by way of limitation, the ranking model may rank the items based on their inferred relevancy to users associated with an entity of third-party system 170. As an example and not by way of limitation, the ranking model may rank the items based on their inferred relevancy to category of users (e.g., age groups or geographic location) associated with an entity of third-party system 170. For each item, the ranking engine may determine a subset of items using a ranking model based on (1) information associated with the item (e.g., price, color, size, or features of the respective item) and (2) information associated with the users or categories of users associated with third-party entity 170 (e.g., demographic information for the user, the user's location, or user profile information, or (3) historical information of interactions by a user or category of users with regard to the respective item (e.g., number of times an item was placed in a basket, reading information of the item, reading reviews of the item, requesting information of the item, placing item on a wish list, or purchasing the item). In particular embodiments, a subset of the items provided by third-party system 170 may be identified by ranking engine 105 based on a value of the ranking model being higher than a pre-determined threshold value. As an example and not by way of limitation, the pre-determined threshold value may correspond to a pre-determined number of items (e.g., 200 items).

In particular embodiments, for each item of the subset identified by ranking the item, grouping engine 115 may determine a grouping of a pre-determined number of items (e.g., 4 items) that are similar to the respective item of the subset. As an example and not by way of limitation, one of the items in the subset may be a particular chair. Grouping engine 115 may group other chairs from the items received from third-party system 170 that may be the same style as the particular chair, but a different color or made from a different material. As illustrated in the example of FIG. 1, video-generation engine 120 receives information of the subset of items and the respective grouped items from ranking engine 105 and grouping engine 115. In particular embodiments, for each of the items of the subset, video-generation engine 120 generates a video incorporating the item from the subset and the respective pre-determined number of grouped items in accordance with the template received from third-party system 170. As described above, the template defines the creative for the video. The generated videos may be cached in data store 164. and, providing for display on a client device of a user, a particular one of the videos selected based on information of the user.

Figure 2:
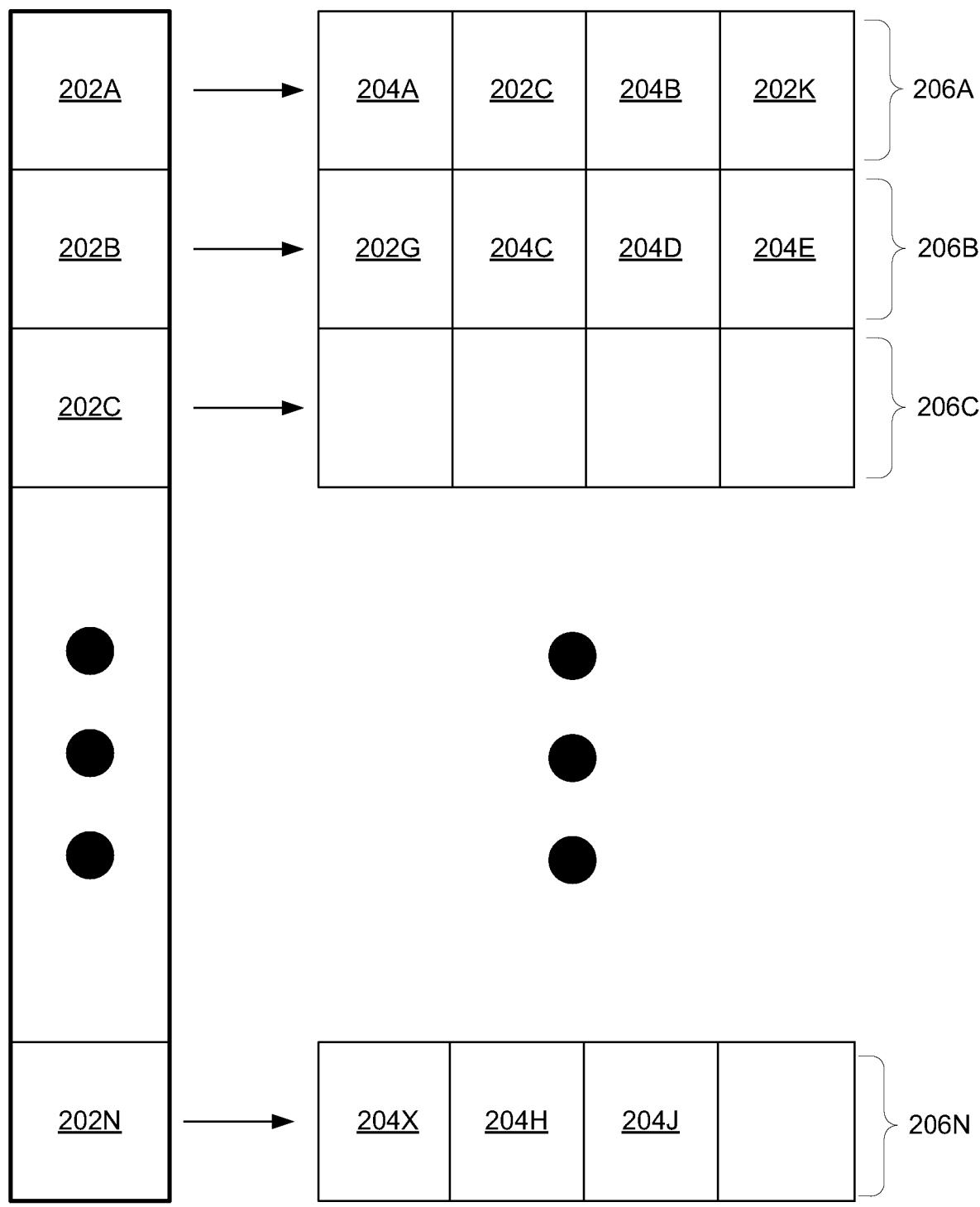
FIG. 2 illustrate example groupings of images.

FIG. 2 illustrates example groupings of images. As described in the example of FIG. 1, the grouping engine 115 identifies product groupings associated with a particular product of the third-party system. Information of a subset of the items 202A-202N that are ranked highest by the ranking engine 105 is sent to the grouping engine. In particular embodiments, for each of the pre-determined number of items, the grouping engine 115 identifies a product grouping of a pre-determined number of products that are similar to respective item. The grouping engine may identify product groupings 206A-206N of products that are similar to each of the subset of items in a catalog stored on the third-party system. As an example and not by way of limitation, one of the items 202A in the subset may be a particular bed and the grouping engine may identify a grouping 206A of other beds 204A-K from the items received from third-party system 170 that may be the same color as the particular bed 202A, but have a different style or are made from a different material. As anther example, grouping engine 115 may identify a group 206C of items that are commonly associated or purchased with the particular item 202C. For example, users that buy a particular brand of pasta may also purchase pasta sauce, cheese, or red pepper flakes along with the pasta. As another example, an entity associated with the third-party system 170 may want to promote a group of products 206N for a particular event. For example, around Thanksgiving, a turkey 202N may be grouped with a pumpkin pie kit 204X, stuffing mix 204H, or mashed potatoes mix 204J. In particular embodiments, the items included in the groupings (e.g., 206A) may be items (e.g., 204A) that are not part of the subset of highest ranked items.

In particular embodiments, groupings of items 206A-206N may be identified based on a similarity ranking. The similarity ranking may be based on information associated with the item (e.g., price, color, size, or features of the respective item). As an example and not by way of limitation, items of a grouping (e.g., 206A) may be identified based on determining items that have similar characteristics (e.g., style or size) as the particular item (e.g., 202A). In particular embodiments, items in a group may be identified based on historical information of interactions by a user or category of users with regard to the respective item (e.g., number of times an item was placed in a basket, reading information of the item, reading reviews of the item, requesting information of the item, placing item on a wish list, or purchasing the item). As another example, items of a grouping (e.g., 206B) may be identified based on determining items that are in a cart of a user that is looking at a particular item (e.g., 202B). As another example, items of a grouping (e.g., 206N) may be identified based on input provided by the entity associated with the third-party system.

Figure 3:
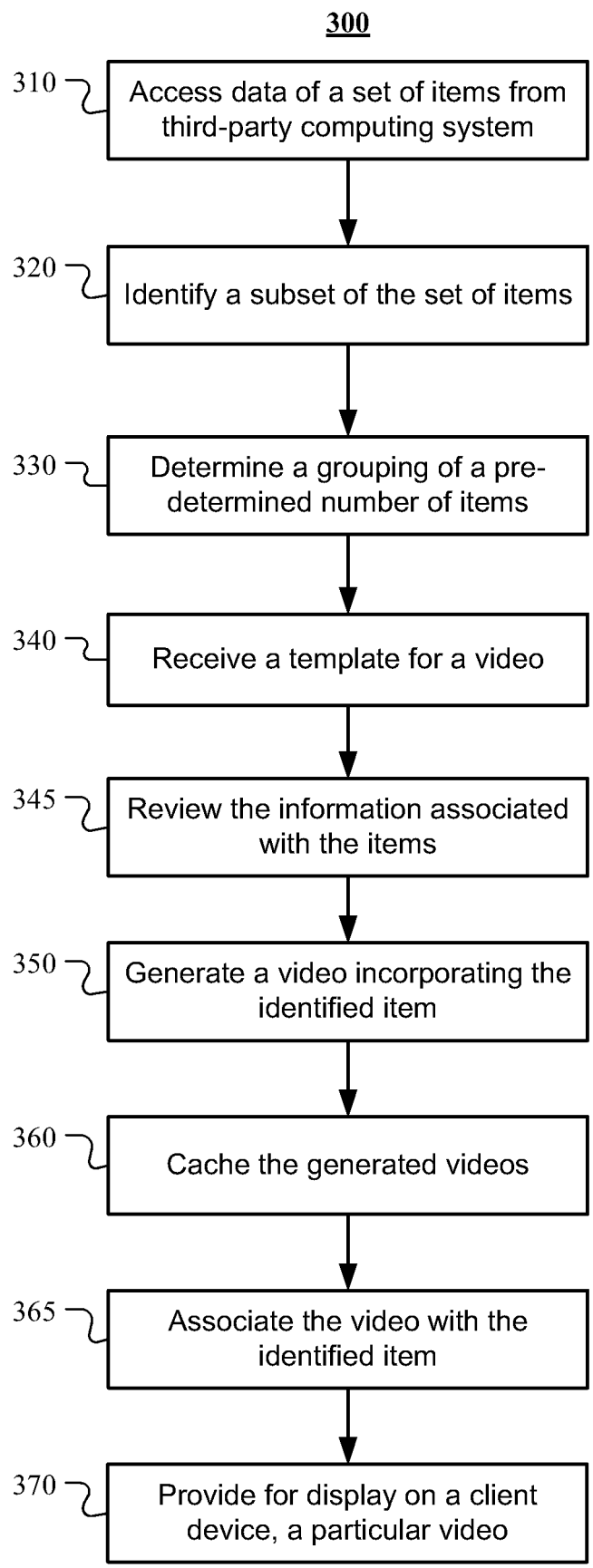
FIG. 3 illustrates an example method for automatically generating videos at scale.

FIG. 3 illustrates an example method for automatically generating videos at scale. The method 300 may begin at step 310, where one or more computing devices access data of a set of items from a third-party computing system. In particular embodiments, the accessed data corresponds to information of items of a product catalog stored on the third-party system. At step 320, the computing device identifies a subset of the set of items based on a value of a ranking model for each identified item being higher than a pre-determined threshold value. In particular embodiments, the ranking model may be based on information of a number of user types (e.g., age, profession, or geographic location). As an example and not by way of limitation, the computing devices may initially identify product groupings of 4 products that are similar to 200 items with information stored on the third-party system. At step 330, for each identified item of the subset, the computing device determines a grouping of a pre-determined number of items from the set of items. In particular embodiments, the grouping of items of a pre-determined number of products that are similar to particular products in the product catalog are identified based on a similarity ranking. At step 340, the computing device receives a template for a video from the third-party computing system. In particular embodiments, an entity creating the videos may select a video template for personalization that includes information of a format (e.g., video, multi-image (carousel), or collection). In addition, the template for videos may specify a Uniform Resource Locator (URL) associated with the video, one or more call-to-action (CTA) buttons, provide a narrative for the video, specify a transition between images, font, background color, or logos.

In particular embodiments, at step 345 the computing device reviews the information associated with the items and remove items that do not meet certain standards (e.g., quality or appropriate content). At step 350, for each of the identified items, the computing device generates a video incorporating the identified item and the respective pre-determined number of grouped items in accordance with the template. In particular embodiments, the computing device combines the template and the information of the identified items and the associated grouping of items into a video package to generate the videos. The video packages may be queued in a video generation engine.

At step 360, the computing device caches the generated videos. In particular embodiments, the generated videos are stored in a data store of a social-networking system. at step 365, the generated videos are associated with the respective identified items. In particular embodiments, for items that do not have an associated video, generation of a video may be triggered after receiving a pre-determined number of user interactions with one or more items without an associated video. As an example and not by way of limitation, a particular item that with a value of the ranking model below the pre-determined threshold may have a video generated for that item based on a number of users (e.g., 20 users) interacting with that item on a product webpage. Cached videos may be periodically updated or updated in response to receiving updated items or item information.

At step 370, the computing device provides for display on a client device of a user, a particular one of the videos selected based on information of the user. The particular video may be rendered for the user at the client device. As described below, the computing system may determine an interest level of the user for the one or more items. In particular embodiments, if the interest level of the user is greater than a threshold level, the computing system may provide the video associated with the item to a client computing device. In particular embodiments, the computing system may be a social-networking system, described below, or any suitable media-hosting or media-distribution system. The interest level may be determined based on any number of suitable factors. As an example and not by way of limitation, the interest level may be based on a duration of time for which the user interacts with a webpage displaying an item. As another example, the interest level may be based on an event that the user has indicated interest in, an event that social graph connections of the user have indicated interest in, an event the user has signed up for, or an event the user has purchased admission.

In particular embodiments, the interest level may be determined based on historical patterns of the user with respect to previous presentations of the item. Such historical patterns may include information about how the user behaved when presented with the item in the past. As an example and not by way of limitation, the historical patterns may include information of the number of times an item was placed in a basket, reading information of the item, reading reviews of the item, requesting information of the item, placing item on a wish list, or purchasing the item. For example, a user may frequently place an item was in a virtual shopping cart, but may have tended to leave an online commerce site without completing a purchase. As another example, the interest level of an item may be based on a history of recent purchases by the user or by social-graph connections of the user. For example, a user may be more interested in a particular chair if some of the user's social-graph connections obtained a similar chair. As another example, the interest level of an item may be based on a history of stores (e.g., online or brick and mortar) recently visited by the user or social-graph connections of the user.

In particular embodiments, the interest level may be determined based on one or more topics associated with the item. The topics may, for example, correspond to concept or user nodes of a social graph described below. Topics may be associated with an item based on information associated with the item (based on, for example, color, style or price; or text of comments, reshares, or posts on an online social network associated with the item). In particular embodiments, the interest level of a user for an item may be determined by calculating an affinity of the user for topics that are associated with the item (which may be determined, for example, based on a degree of separation between a node corresponding to the user and a node corresponding to the media item on a social graph, or based on any other suitable social graph information). As an example and not by way of limitation, a particular user may be determined to have a high affinity for the topic "cooking" (e.g., as determined by the particular user's history of watching videos related to cooking, liking posts or pages related to cooking recipes, etc.), in which case, the particular user may be determined to have a relatively high interest level for items associated with cooking (e.g., foods or cookware). In particular embodiments, the interest level may be determined based on demographical information of the user. In some examples, users of a particular demographic (e.g., an age group) may share traits that make them more interested in a particular item than another demographic. This may be determined based on any suitable study, such as correlational analyses of historical usage by users of the particular demographic (e.g., users of an online social network) with respect to the particular item, related items, or other items with the same or similar topic. As an example and not by way of limitation, all else equal, users in the millennials (or Generation Y) demographic may have a higher interest level for an item associated with the topic "Pokemon Go" than users in the Generation X demographic (e.g., because millennials may have a higher affinity for Pokemon Go).

In particular embodiments, interest level of an item may be based on an affinity level of the user for the item. In particular embodiments, the affinity level of the user for an item may be a measure of an affinity the user has for the item or for other or more users or entities associated with the item (e.g., users who liked the item). In particular embodiments, the affinity level may be based on a measure of affinity the user has for a type of the item. As an example and not by way of limitation, the user may have a relatively high affinity for items that are games, in which case, the affinity level of such an item may be higher than otherwise. In particular embodiments, the affinity level of the user may be determined based on a number of degrees of separation between the first node of the user and a second node associated with the item. In particular embodiments, the interest level of the user may be adjusted upward or downward based on the determined affinity level. As an example and not by way of limitation, if the user has an affinity level that is greater than a threshold affinity level, the interest level of the user may be adjusted upward. For example, if the user has a relatively high affinity level for Gazorpazorp Cola (e.g., the user may have previously liked content by Gazorpazorp Cola or a page associated with Gazorpazorp Cola), the interest level for an item by Gazorpazorp Cola may be adjusted upward. As another example, if the user has an affinity level that is below a minimum affinity level (e.g., if the user has previously indicated a dislike for content by Gazorpazorp Cola), the interest level of the user may be adjusted downward. In particular embodiments, the amount of adjustment may be based on the amount by which the affinity level exceeds the threshold affinity level or by which the affinity level is below the minimum affinity level. In particular embodiments, a computing device may consider the user's affinity level for all potential items when adjusting the interest level. As an example and not by way of limitation, there may be a grouping of 4 potential items, in which case, a computing system may look at affinity levels for all items of the grouping. In particular embodiments, the affinity level for a particular item may be adjusted based on the user's previous interactions with the particular item, or a related item. As an example and not by way of limitation, if the user has already seen the particular item within the last five hours, the affinity level for particular sponsored content item (or other sponsored content items by the same sponsoring entity or user) may be adjusted downward. As another example and not by way of limitation, if the user previously indicated a lack of interest in the particular item (or other items by the same entity or user) by scrolling away from the item or submitting an input to hide the item, the affinity level of the particular item may be adjusted downward. In particular embodiments, the affinity level may not be a measure for simply adjusting the interest level of the user, but may be an additional and independent factor in determining whether to present a video featuring an item. In particular embodiments, if the interest level of item for the user is greater than a threshold interest level, a computing device may send, to a client computing device, a cached video associated with the item, as described above.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for automatically generating videos at scale including the particular steps of the method of FIG. 3, this disclosure contemplates any suitable method for automatically generating videos at scale including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
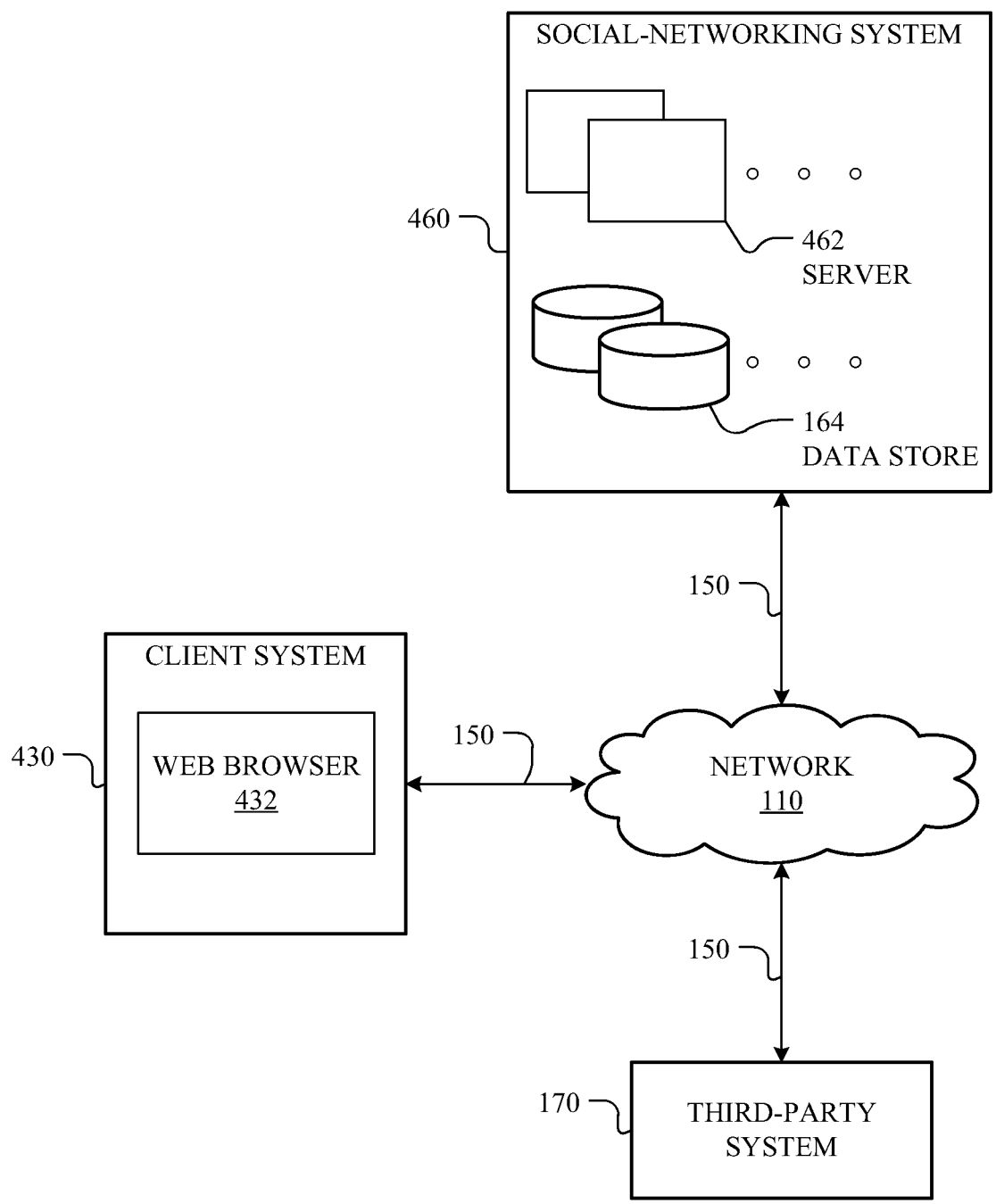
FIG. 4 illustrates an example network environment associated with a social-networking system.

FIG. 4 illustrates an example network environment associated with a social-networking system. Network environment 400 includes a client system 430, a social-networking system 460, and a third-party system 170 connected to each other by a network 110. Although FIG. 4 illustrates a particular arrangement of client system 430, social-networking system 460, third-party system 170, and network 110, this disclosure contemplates any suitable arrangement of client system 430, social-networking system 460, third-party system 170, and network 110. As an example and not by way of limitation, two or more of client system 430, social-networking system 460, and third-party system 170 may be connected to each other directly, bypassing network 110. As another example, two or more of client system 430, social-networking system 460, and third-party system 170 may be physically or logically co-located with each other in whole or in part. Moreover, although FIG. 4 illustrates a particular number of client systems 430, social-networking systems 460, third-party systems 170, and networks 110, this disclosure contemplates any suitable number of client systems 430, social-networking systems 460, third-party systems 170, and networks 110. As an example and not by way of limitation, network environment 400 may include multiple client system 430, social-networking systems 460, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 430, social-networking system 460, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 400. One or more first links 150 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 110. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 170), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 110. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 110. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 170 to manage, retrieve, modify, add, or delete, the information stored in data store 164.

In particular embodiments, social-networking system 460 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 170, which is separate from social-networking system 460 and coupled to social-networking system 460 via a network 110.

In particular embodiments, social-networking system 460 may be capable of linking a variety of entities. As an example and not by way of limitation, social-networking system 460 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 460. In particular embodiments, however, social-networking system 460 and third-party systems 170 may operate in conjunction with each other to provide social-networking services to users of social-networking system 460 or third-party systems 170. In this sense, social-networking system 460 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 170 via network 110. The web server may include a mail server or other messaging functionality for receiving and routing messages between social-networking system 460 and one or more client systems 430. An API-request server may allow a third-party system 170 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 430 associated with users. Advertisement-pricing modules may combine social information, the current time, location information, or other suitable information to provide relevant advertisements, in the form of notifications, to a user.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social-networking system 460 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 462 may be authorization/privacy servers for enforcing privacy settings. In response to a request from a user (or other entity) for a particular object stored in a data store 164, social-networking system 460 may send a request to the data store 164 for the object. The request may identify the user associated with the request and may only be sent to the user (or a client system 430 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 5:
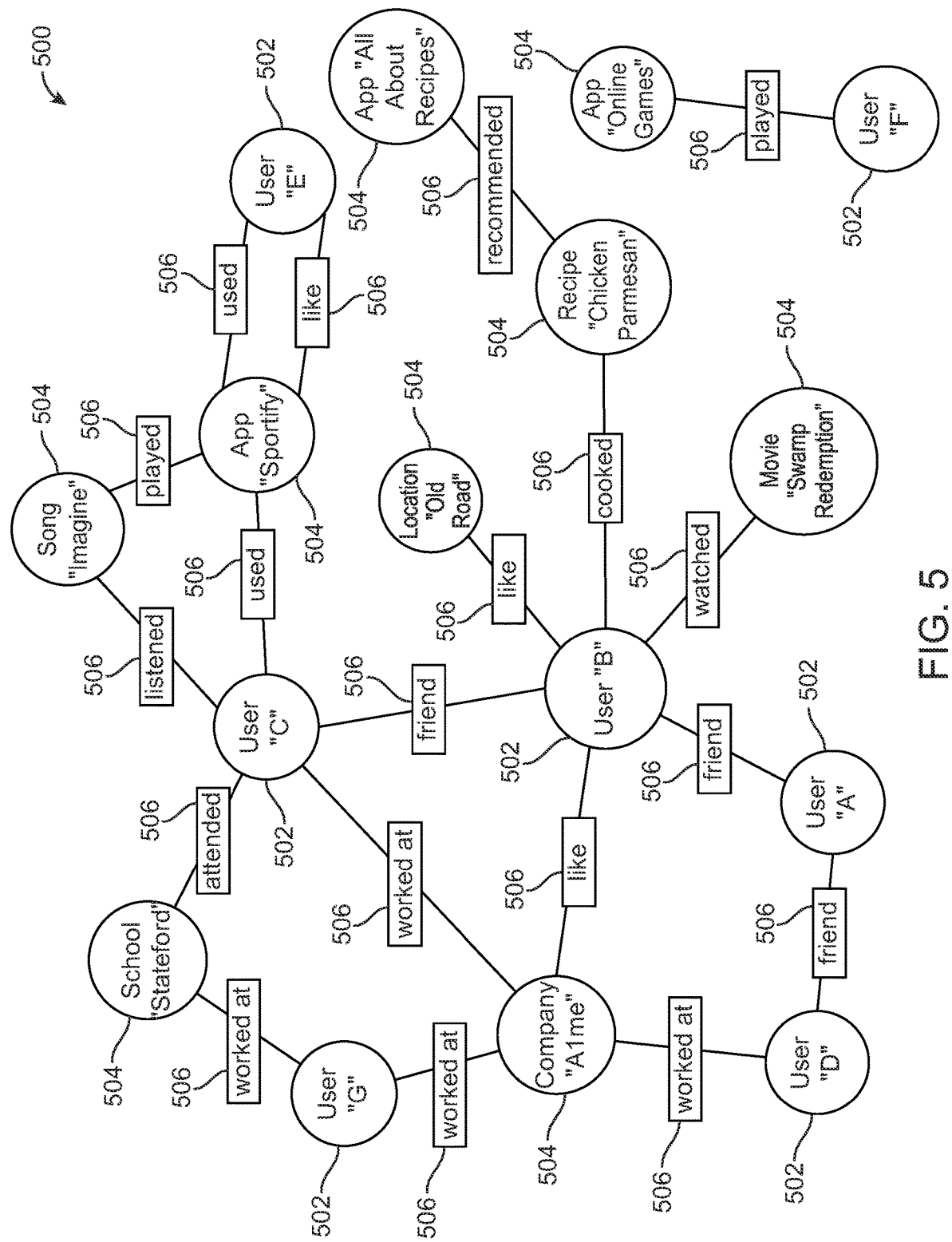
FIG. 5 illustrates an example social graph.

FIG. 5 illustrates an example social graph. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Each node may be associated with a unique entity (i.e., user or concept), each of which may have a unique identifier (ID), such as a unique number or username. Example social graph 500 illustrated in FIG. 5 is shown, for didactic purposes, in a two-dimensional visual map representation. In particular embodiments, a social-networking system 460, client system 430, or third-party system 170 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 170. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 164. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506. The degree of separation between two objects represented by two nodes, respectively, is a count of edges in a shortest path connecting the two nodes in the social graph 500. As an example and not by way of limitation, in the social graph 500, the user node 502 of user "C" is connected to the user node 502 of user "A" via multiple paths including, for example, a first path directly passing through the user node 502 of user "B," a second path passing through the concept node 504 of company "Acme" and the user node 502 of user "D," and a third path passing through the user nodes 502 and concept nodes 504 representing school "Stanford," user "G," company "Acme," and user "D." User "C" and user "A" have a degree of separation of two because the shortest path connecting their corresponding nodes (i.e., the first path) includes two edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504).

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 130 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 460 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 460) or RSVP (e.g., through social-networking system 460) to an event associated with the advertisement. In addition or as an alternative, an advertisement may include social-networking-system content directed to the user. As an example and not by way of limitation, an advertisement may display information about a friend of the user within social-networking system 460 who has taken an action associated with the subject matter of the advertisement.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 460 to identify those users. In addition or as an alternative, social-networking system 460 may use user-profile information in social-networking system 460 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 460, off or outside of social-networking system 460, or on mobile computing devices of users. When on or within social-networking system 460, such targeting may be directed to users' news feeds, search results, e-mail or other in-boxes, or notifications channels or may appear in particular area of web pages of social-networking system 460, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 460, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 460 or explicit connections of a user to a node, object, entity, brand, or page on social-networking system 460. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals; light-weight connections (e.g., "check-ins"); connection lookalikes; fans; extracted keywords; EMU advertising; inferential advertising; coefficients, affinities, or other social-graph information; friendsof-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

In particular embodiments, social-networking system 460 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 460 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 460 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 460 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system &60 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 460 may calculate a coefficient based on a user's actions. Social-networking system 460 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 460 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 460 may analyze a user's actions to determine whether one or more of the actions indicate an affinity for subject matter, content, other users, and so forth. As an example and not by way of limitation, if a user frequently posts content related to "coffee" or variants thereof, social-networking system 460 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 460 may calculate a coefficient based on the type of relationship between particular objects. Referencing the social graph 500, social-networking system 460 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 460 may determine that the user has a higher coefficient with respect to the first photo than the second photo because having a tagged-in-type relationship with content may be assigned a higher weight and/or rating than having a like-type relationship with content. In particular embodiments, social-networking system &60 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 460 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, social-graph entities that are closer in the social graph 500 (i.e., fewer degrees of separation) may have a higher coefficient than entities that are further apart in the social graph 500.

In particular embodiments, social-networking system 460 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 460 may determine that the user has a higher coefficient for the airport than the gas station based on the proximity of the airport to the user.

In particular embodiments, social-networking system 460 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 460 may provide information that is relevant to user's interests and current circumstances, increasing the likelihood that they will find such information of interest. In particular embodiments, social-networking system 460 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 460 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 460 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 460 may calculate the coefficient (or access the coefficient information if it has previously been calculated and stored). In particular embodiments, social-networking system 460 may measure an affinity with respect to a particular process. Different processes (both internal and external to the online social network) may request a coefficient for a particular object or set of objects. Social-networking system 460 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 6:
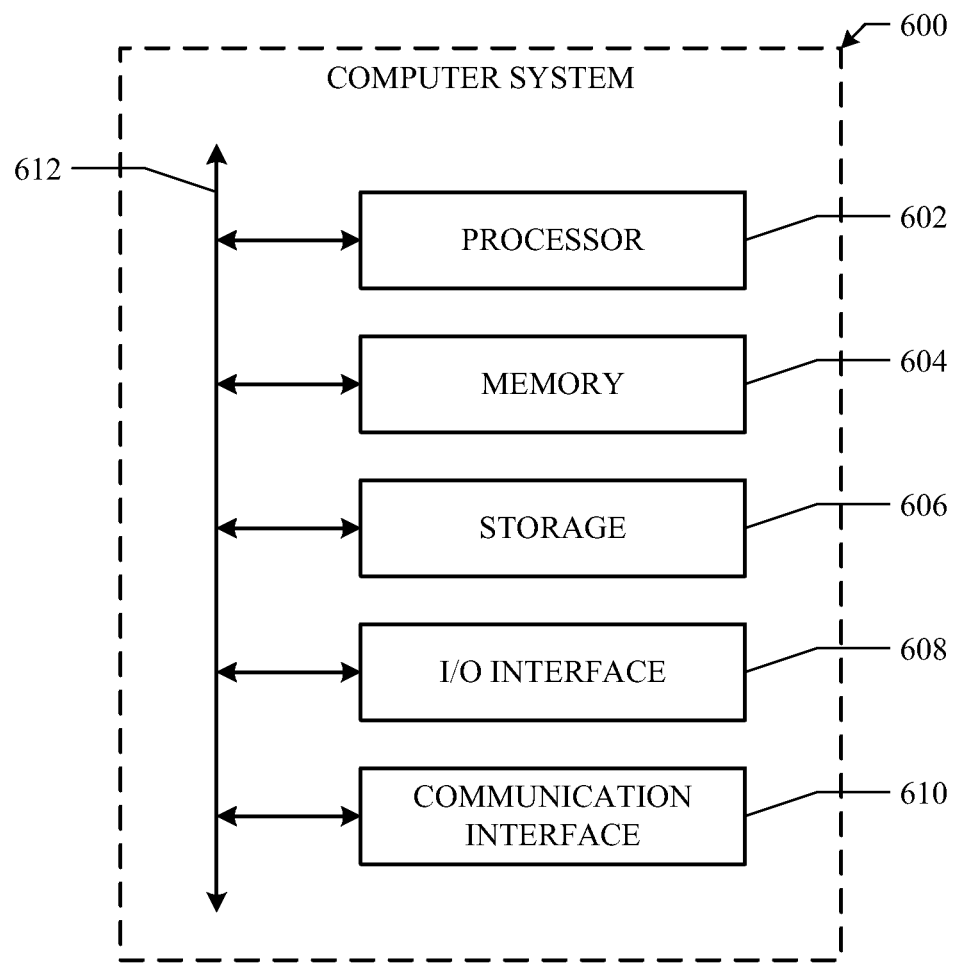
FIG. 6 illustrates an example computer system.

FIG. 6 illustrates an example computer system. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by one or more computing devices, accessing data of a plurality of items from a third-party computing system;
by the one or more computing devices, identifying a subset of the plurality of items based on a value of a ranking model for each identified item being higher than a pre-determined threshold value;
by the one or more computing devices, for each identified item of the subset, determining a grouping of a number of items from the plurality of items that are similar to the identified item;
by the one or more computing devices, receiving a template for video creation from the third-party computing system;
by the one or more computing devices, for each of the identified items, automatically creating a new video by combining (1) the identified item and (2) the respective number of grouped items that are similar to the identified item in accordance with the template received from the third-party computing system;
by the one or more computing devices, caching the created videos; and
by the one or more computing devices, providing for display on a client device of a user, a particular one of the videos selected based on information of the user.

2. The method of claim 1, wherein the ranking model is based on information of a plurality of user types.

3. The method of claim 2, wherein creating the new video comprises creating a video for each of the plurality of user types.

4. The method of claim 1, wherein the particular one of the videos is selected based on a value of an affinity coefficient between the user and an item of the particular one of the videos.

5. The method of claim 1, wherein the particular one of the videos is selected based on an event that the user has indicated interest in, social graph connections of the user has indicated interest in, the user has signed up for, or the user has purchased admission.

6. The method of claim 1, wherein the particular one of the videos is selected based on recent interactions of the user.

7. The method of claim 1, wherein determining the grouping of the number of items from the plurality of items is based on a similarity ranking.

8. The method of claim 1, wherein the template comprises a format type of the new video, a uniform resource locator (URL) associated with the identified item, a type of transition between images, one or more calls-to-action (CTA) buttons, a type of font, one or more logos, or background color.

9. The method of claim 1, further comprising updating one or more of the videos in response to receiving updated information of a respective identified item.

10. The method of claim 1, further comprising:
identifying one or more items of the plurality of items without an associated video; and
creating a video for each identified item without the associated video in accordance with the template, wherein the video incorporates identified item without the associated video and a pre-determined number of grouped items that are similar to the identified item.

11. One or more computer-readable non-transitory storage media embodying software that is operable when executed to:
access data of a plurality of items from a third-party computing system;
identify a subset of the plurality of items based on a value of a ranking model for each identified item being higher than a pre-determined threshold value;
for each identified item of the subset, determine a grouping of a number of items from the plurality of items that are similar to the identified item;
receive a template for video creation from the third-party computing system;
for each of the identified items, automatically create a new video by combining (1) the identified item and (2) the respective number of grouped items that are similar to the identified item in accordance with the template received from the third-party computing system;
cache the created videos; and
provide for display on a client device of a user, a particular one of the videos selected based on information of the user.

12. The media of claim 11, wherein the ranking model is based on information of a plurality of user types.

13. The media of claim 12, wherein software is further operable to create a video for each of the plurality of user types.

14. The media of claim 11, wherein the particular one of the videos is selected based on a value of an affinity coefficient between the user and an item of the particular one of the videos.

15. The media of claim 11, wherein the particular one of the videos is selected based on an event that the user has indicated interest in, social graph connections of the user has indicated interest in, the user has signed up for, or the user has purchased admission.

16. A system comprising:
one or more processors; and
a memory coupled to the processors comprising instructions executable by the processors, the processors being operable when executing the instructions to:
access data of a plurality of items from a third-party computing system;
identify a subset of the plurality of items based on a value of a ranking model for each identified item being higher than a pre-determined threshold value;
for each identified item of the subset, determine a grouping of a number of items from the plurality of items that are similar to the identified item;
receive a template for video creation from the third-party computing system;
for each of the identified items, automatically create a new video by combining (1) the identified item and (2) the respective number of grouped items that are similar to the identified item in accordance with the template received from the third-party computing system;

cache the created videos; and provide for display on a client device of a user, a particular one of the videos selected based on information of the user.

17. The system of claim 16, wherein the ranking model is based on information of a plurality of user types.

18. The system of claim 17, wherein processors are further operable to create a video for each of the plurality of user types.

19. The system of claim 16, wherein the particular one of the videos is selected based on a value of an affinity coefficient between the user and an item of the particular one of the videos.

20. The system of claim 16, wherein the particular one of the videos is selected based on an event that the user has indicated interest in, social graph connections of the user has indicated interest in, the user has signed up for, or the user has purchased admission.

* * * * *